US009548693B2

(12) United States Patent
Hyypio et al.

(10) Patent No.: US 9,548,693 B2
(45) Date of Patent: Jan. 17, 2017

(54) METHODS AND VOLTAGE REGULATOR FOR POWER DISTRIBUTION IN A HYBRID SYSTEM

(71) Applicant: Regal Beloit America, Inc., Beloit, WI (US)

(72) Inventors: David Bruce Hyypio, Schofield, WI (US); Myron Roman Mychal, Schofield, WI (US)

(73) Assignee: Regal Beloit America, Inc., Beloit, WI (US)

( * ) Notice: Subject to any disclaimer, the term of this patent is extended or adjusted under 35 U.S.C. 154(b) by 252 days.

(21) Appl. No.: 13/655,131

(22) Filed: Oct. 18, 2012

(65) Prior Publication Data

US 2014/0111012 A1    Apr. 24, 2014

(51) Int. Cl.

| H02P 9/00 | (2006.01) |
|---|---|
| H02P 9/48 | (2006.01) |
| H02P 9/10 | (2006.01) |
| B60L 3/00 | (2006.01) |
| B60L 11/00 | (2006.01) |
| B60L 11/12 | (2006.01) |
| B60L 11/18 | (2006.01) |
| B60L 15/02 | (2006.01) |
| H02P 101/45 | (2015.01) |

(52) U.S. Cl.
CPC ............. *H02P 9/48* (2013.01); *B60L 3/0061* (2013.01); *B60L 11/005* (2013.01); *B60L 11/123* (2013.01); *B60L 11/126* (2013.01); *B60L 11/1864* (2013.01); *B60L 15/025* (2013.01); *H02P 9/10* (2013.01); *B60L 2210/30* (2013.01); *B60L 2210/40* (2013.01); *B60L 2220/14* (2013.01); *B60L 2240/427* (2013.01); *B60L 2240/429* (2013.01); *H02P 2101/45* (2015.01); *Y02T 10/6217* (2013.01); *Y02T 10/643* (2013.01); *Y02T 10/7005* (2013.01); *Y02T 10/7022* (2013.01); *Y02T 10/7061* (2013.01); *Y02T 10/7077* (2013.01); *Y02T 10/7241* (2013.01); *Y10T 307/549* (2015.04)

(58) Field of Classification Search
CPC ................. H02P 9/48; H02P 9/10; H02J 4/00
USPC .............. 322/24, 28, 20, 44; 290/52; 307/52
See application file for complete search history.

(56) References Cited

U.S. PATENT DOCUMENTS

| 4,246,531 A * | 1/1981 | Jordan ........................... 322/28 |
|---|---|---|
| 4,543,521 A * | 9/1985 | Morishita et al. ............ 320/123 |
| 4,973,896 A * | 11/1990 | Shiga et al. .................... 322/28 |
| 5,055,765 A | 10/1991 | Rozman et al. |
| 5,061,889 A * | 10/1991 | Iwatani et al. .................. 322/28 |
| 5,502,368 A * | 3/1996 | Syverson et al. ............... 322/28 |
| 5,994,881 A | 11/1999 | Miyazaki et al. |
| 6,005,372 A * | 12/1999 | Kouwa et al. .................. 322/25 |
| 6,163,138 A * | 12/2000 | Kohl et al. ...................... 322/28 |
| 6,396,161 B1 | 5/2002 | Crecelius et al. |

(Continued)

OTHER PUBLICATIONS

ISR/WO dated Dec. 20, 2013 for PCT/US 13/6359 filed Oct. 8, 2013, 16 pages.

*Primary Examiner* — Julio Gonzalez Ramirez
(74) *Attorney, Agent, or Firm* — Armstrong Teasdale LLP

(57) ABSTRACT

Methods and a voltage regulator are provided for distributing power sourcing in a hybrid power plant system. The voltage regulator is configured to monitor an output power of a generator and control an excitation signal provided to the generator based at least in part on the generator output power.

12 Claims, 3 Drawing Sheets

(56) References Cited

U.S. PATENT DOCUMENTS

| | | | |
|---|---|---|---|
| 6,528,973 B2 | 3/2003 | Fury | |
| 6,703,808 B1 | 3/2004 | Blackburn et al. | |
| 6,798,627 B2 * | 9/2004 | Schultz et al. | 361/20 |
| 7,224,147 B2 * | 5/2007 | Shah et al. | 322/46 |
| 7,710,693 B2 | 5/2010 | Guzman-Casillas et al. | |
| 7,746,038 B2 | 6/2010 | Maddali et al. | |
| 8,227,935 B2 * | 7/2012 | Nishiyama | 307/46 |
| 2001/0048290 A1 * | 12/2001 | Underwood et al. | 322/20 |
| 2009/0195074 A1 * | 8/2009 | Buiel | 307/48 |
| 2010/0241283 A1 | 9/2010 | Desai et al. | |
| 2011/0273148 A1 * | 11/2011 | Ueno et al. | 322/28 |

* cited by examiner

METHODS AND VOLTAGE REGULATOR FOR POWER DISTRIBUTION IN A HYBRID SYSTEM

BACKGROUND

The embodiments described herein relate generally to hybrid power plant systems, and more particularly, to methods and systems of distributing active power sourcing in hybrid power plant systems.

In certain hybrid power plant systems, a synchronous generator shares production of power demanded by a load with other sources of power to drive an engine. The other sources of power are often of a direct current (DC) nature, for example, a battery bank coupled in parallel with the generator. The hybrid power plant systems are generally those that have variable power demand are designed such that no single power source is capable of providing all the required power during periods of high power demand.

In such hybrid systems, the generator includes a voltage regulator for output voltage by the generator. A typical voltage regulator has a function that lets a user define a desired generator output voltage. The voltage regulator measures the generator's output voltage and attempts to keep it at that user-defined voltage by increasing or decreasing excitation current to the generator. Typical voltage regulators tend to have problems in sharing the load demand with the battery bank. Because the battery bank is not an ideal and constant DC power source, it outputs a voltage which is dependent on charging and/or discharging conditions at a particular instant in time. If the voltage of the battery bank is lower than the rectified generator output voltage, the battery bank suppresses the generator output voltage. Conversely, if the voltage of the battery bank is higher than the rectified generator output voltage, the battery bank unloads the generator, causing the generator output voltage to increase. Because of the influence of the battery voltage on the generator output voltage, the voltage regulator continuously reacts to changes in battery voltage, which may cause unstable voltages regulation and/or other conditions that may trip faults, which may cause nuisance behavior and/or damage or destroy system components. Such poor load sharing is due to the voltage regulator's response to battery loading characteristics. Known methods of load sharing do not alter the voltage regulator's control strategy during periods of battery draw.

For example, in a hybrid vehicle with an engine-generator set and a battery bank, during normal operation, the generator alone provides sufficient power for the electric motors to enable the vehicle to move. But, if the vehicle is driven up a steep hill, or if the load is increased, the generator may need assistance from the battery bank for short durations. The voltage regulator on the vehicle must recognize a heavy load condition and control the generator output to achieve load sharing with the batteries. Voltage regulators that are not designed for load sharing with DC sources provide poor load sharing during engagement of battery power draw because they are constantly reacting to influences of instantaneous changes in battery terminal voltage. Voltage regulators that do not implement a strategy for battery load sharing exhibit unsteady voltage regulation, causing periods of engine overloading. This may cause the engine speed to drop during the overload event, further causing a voltage dip to ripple through the electrical drive system. Voltage dips may cause nuisance power trips of downstream connected power converters and may cause the vehicle to lose power.

BRIEF DESCRIPTION

In one aspect, a voltage regulator is provided. The voltage regulator is configured to monitor an output power of a generator and control an excitation signal provided to the generator based at least in part on the generator output power.

In another aspect, a method of distributing active power sourcing between a generator and a secondary power source to drive a load is provided. The method includes monitoring an output power of the generator and controlling an excitation signal provided to the generator based at least in part on the generator output power using a voltage regulator.

In yet another aspect, a hybrid power plant system is provided. The system includes a generator configured to produce an electrical output to drive a load, a secondary power source coupled to the generator, the secondary power source configured to assist the generator during peak power demand of the load, and a voltage regulator coupled to the generator. The voltage regulator is configured to monitor an output power of the generator and control an excitation signal provided to the generator based at least in part on the generator output power.

DETAILED DESCRIPTION

The embodiments described herein relate to hybrid power plant systems, and more particularly, to methods and systems of distributing active power sourcing in hybrid power plant systems. More particularly, the embodiments relate to a voltage regulator that is configured to facilitate distributing active power sourcing in hybrid power plant systems. The embodiments facilitate automatically changing a voltage regulator's control from a voltage regulation regime to a constant power regime when a predetermined level of generator output power is measured. It should be understood that the embodiments described herein for electrical machines are not limited to hybrid power plant systems, and should be further understood that the descriptions and figures that utilize a hybrid power plant system are exemplary only. Moreover, while the embodiments illustrate three phase electric generators, the embodiments described herein may be included within generators having any number of phases, including single phase and multiple phase electric generators.

Figure 1:
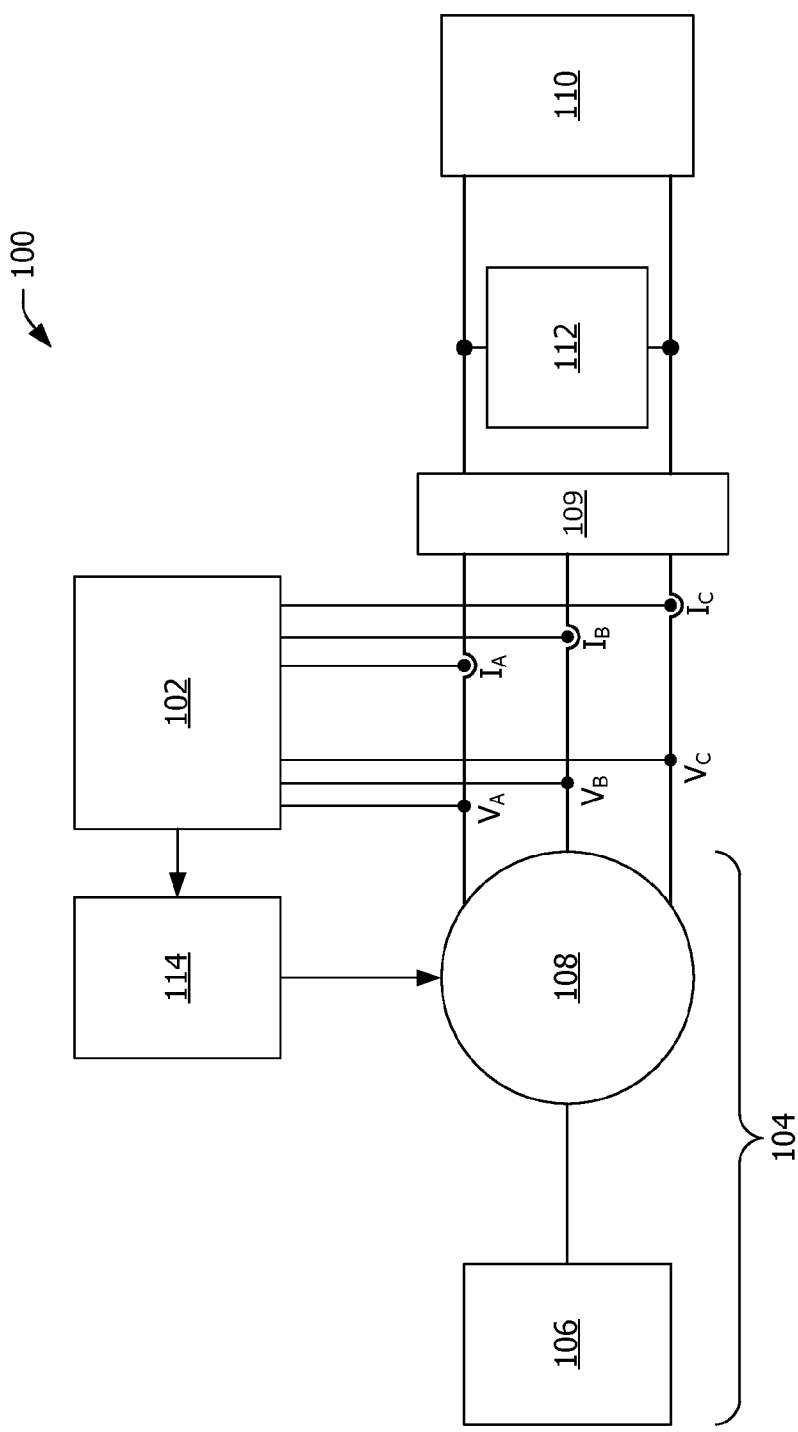
FIG. 1 illustrates a hybrid power plant system that includes a voltage regulator.

FIG. 1 illustrates a hybrid power plant system 100 that includes a voltage regulator 102. In the exemplary embodiment, system 100 includes a generator set 104 having a prime mover 106 that mechanically rotates a rotor (not shown) of generator 108 to provide electrical power to a load 110, and a secondary power source 112 for providing supplemental power to load 110 during peak power demand.

In the exemplary embodiment, prime mover 106 is a heat engine, for example, an internal or external combustion engine that combusts a mixture of fuel and air to produce the mechanical rotation of the rotor in generator 108. More specifically, prime mover 106 may be any type of combustion engine such as, for example, a diesel engine, a gasoline engine, or a gaseous fuel-powered engine. In alternative embodiments, prime mover 106 may be any non-engine type of mechanical power-producing device.

In the exemplary embodiment, generator 108 is mechanically-driven to provide an electrical power output. For example, generator 108 may be either a DC generator or an AC generator having a rectified output. Moreover, generator 108 may embody any type of known generator, including but not limited to an AC induction generator, a permanent-magnet generator, an AC synchronous generator, or a switched-reluctance generator. In the exemplary embodiment, generator 108 is a three-phase AC synchronous generator. More specifically, generator 108 may include a rotor (not shown) that rotates relative to a stator (not shown). The rotor may include a set of electrical field coils that may be energized by a field excitation current delivered to the field coils. The rotor is driven to rotate by prime mover 106. The stator of generator 108 includes a set of stationary coils positioned about the rotor such that the rotor may rotate within the stator. As the rotor rotates, an AC current is induced in the stationary coils. This current is directed out of generator 108 in the form of an AC power signal. The output voltage of generator 108 may be controlled by controlling a magnitude of the field current applied to the field coils. In the embodiment wherein generator 108 is an AC generator, a rectifier 109 may be provided to couple the AC output power of generator 108 to the DC power of secondary power source 112.

In the exemplary embodiment, load 110 is powered by the DC power output generated by generator 108 and rectifier 109. Operation of prime mover 106 may be affected by an electrical load change on generator 108. For example, where system 100 is included in a drive train of a hybrid vehicle being driven up a steep hill or a large amount of weight is added to the vehicle, load 110 increases causing generator 108 to require more mechanical power from prime mover 106. Alternatively, when the vehicle reaches the top of the hill or the weight is removed, generator 108 requires less power from prime mover 106.

In the exemplary embodiment, to protect generator 108 from exceeding its maximum rated power, secondary power source 112 is coupled in parallel to generator 108 and rectifier 109. In the exemplary embodiment, secondary power source 112 is a DC power source. More specifically, in the exemplary embodiment, secondary power source 112 is a battery or a battery bank. Any type of battery known for use in hybrid systems may be used, including, but not limited to, a nickel metal hydride battery and/or a lead acid battery. Alternatively, secondary power source 112 may be an ultra-capacitor or any other DC power source that enables system 100 to function as described herein. As used herein, the term "secondary power source" means a power source in addition to generator 108 and rectifier 109 for driving load 110.

In the exemplary embodiment, voltage regulator 102 receives an AC voltage output and an AC current output by generator 108. Voltage regulator 102 uses the AC voltage and AC current to calculate the power being output by generator 108. More specifically, voltage regulator 102 includes, in one embodiment, one or more formulas stored in a memory device that are utilized to convert the AC voltage and/or AC current outputted by generator 108 to one or more parameters indicative of an operating state of generator 108.

Voltage regulator 102 controls operation of generator 108 by controlling the field current to generator 108. More specifically, voltage regulator 102 controls the field current of generator 108 in order to set voltage and output power of generator 108. Such controlling may be referred to as "power limiting mode". To provide power limiting mode, voltage regulator 102 is coupled to a generator exciter 114 included within generator 108. Generator exciter 114 receives the output voltage and the output power from voltage regulator 102 and excites generator 108.

In power limiting mode, a user inputs a voltage limit as well as a power limit for generator 108 using user input interface 210. The power limit is inputted as a percentage of a rated output of generator 108. Typically, the power limit is set at 100%, but it can be set at any percentage desired by the user. Voltage regulator 102 continuously monitors AC voltage and AC current being outputted by generator 108. While generator 108 operates under its power limit (i.e., the truck is driving on a normal grade and not demanding a lot of power from the generators), voltage regulator 102 regulates the voltage to remain at or below the user-defined voltage limit as during normal operation. As load 110 increases (going up a hill, more physical weight on the truck), more power output is required from generator 108. As a result, because voltage is maintained substantially constant by voltage regulator 102, the current in generator 108 rises to meet the power demand. When generator 108 output power reaches the user-defined limit, voltage regulator 102 decreases the excitation signal to generator 108. More specifically, voltage regulator 102 decreases the voltage to generator 108, while the output power of the generator remains the same. When the generator output voltage decreases to a certain level, secondary power source 112 automatically activates because it becomes the dominant source of DC power as the output of generator 108 is reduced. In essence, voltage regulator 102 induces excitation of secondary power source 112 to provide current by decreasing AC output the voltage of generator 108 and thereby decreasing the voltage of rectifier 109.

As power demanded by load 110 decreases below the user-defined power limit, the power output of generator 108 also decreases. Voltage regulator 102 detects this decrease in power and sends an excitation signal to generator exciter 114 to increase the voltage, creating a fluid transition where only generator 108 and rectifier 109 are used to drive load 110. Secondary power source 112 is no longer needed at this point because generator 108 can drive load 110 while remaining under its rated power output.

Figure 2:
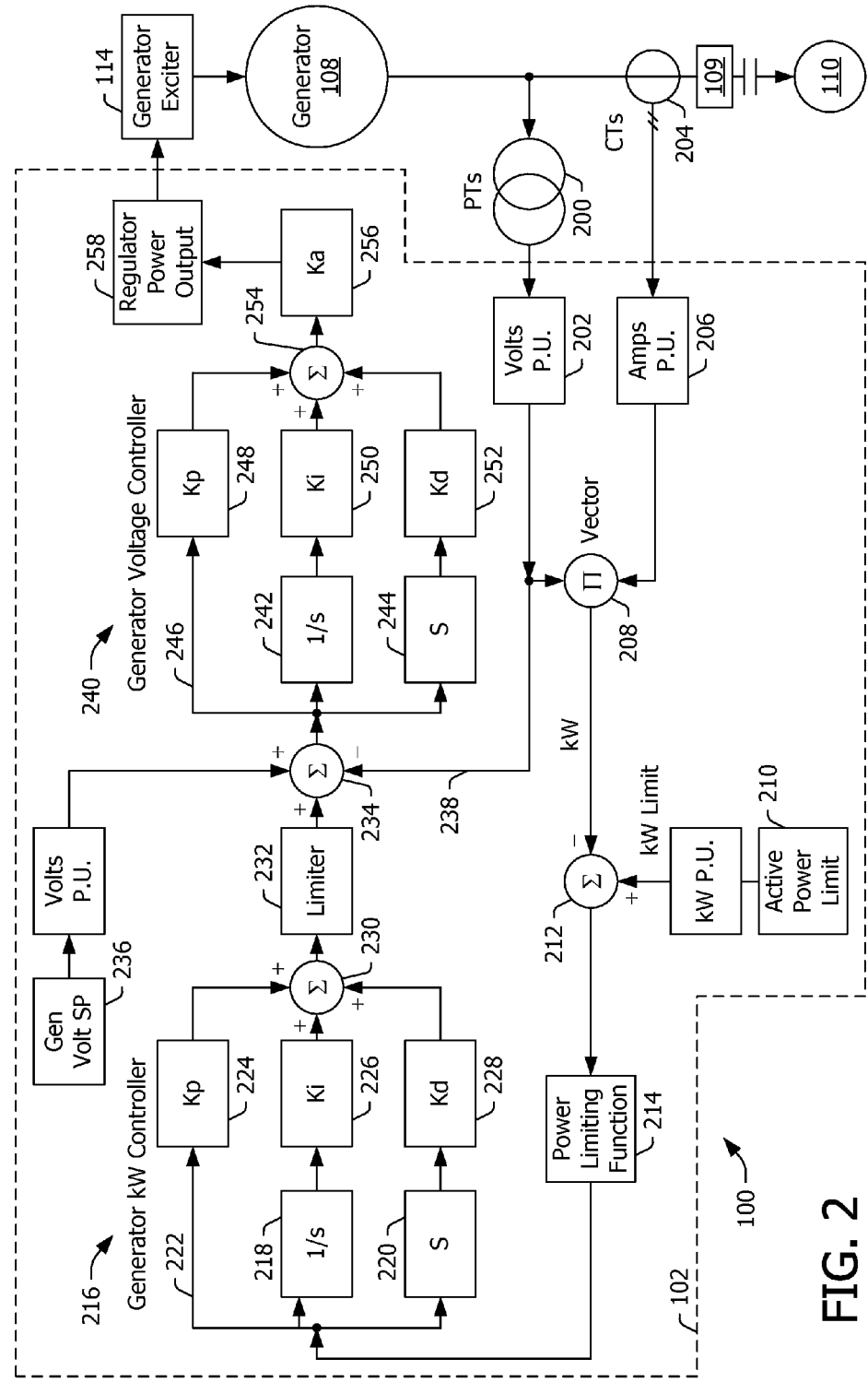
FIG. 2 is a block diagram of an exemplary voltage regulator that may be used with the system shown in FIG. 1.

FIG. 2 is a block diagram of an exemplary voltage regulator 102 (shown in FIG. 1) that may be used with system 100 (shown in FIG. 1). In the exemplary embodiment, voltage regulator 102 is a computing device capable of executing instructions stored on memory device (not shown).

In the exemplary embodiment, a magnitude of generator 108 output voltage is determined by the level of current in an exciter field of generator 108. In one aspect, potential transformers 200 are used to step down voltage of generator 108 to an appropriate level for AC voltage sensing inputs 202 of voltage regulator 102. Generator 108 current levels are sensed using current transformers 204. Secondary windings of current transformers 204 are coupled to AC current sensing inputs 206 of voltage regulator 102. In the exemplary embodiment, voltage regulator 102 computes active power by vectorially multiplying the current of generator 108 by the phase voltage of generator 108 at vector 208. The resulting vector product represents an active power delivered by generator 108 to load 110.

In the exemplary embodiment, a user-definable active power limit 210 programmed into voltage regulator 102 is inputted into a summing junction 212. Summing junction 212 subtracts the value of instantaneous generator active power 208 from active power limit 210 value. The result of the sum is input into a power limiting function 214. If the input to power limiting function 214 is positive or zero, the output of power limiting function 214 is zero. If the result is negative, its value is input into an active generator power proportional-integral-derivative (PID) controller 216.

In the exemplary embodiment, active power PID controller 216 acts on the output of power limiting function 214 by performing a time-based integration function 218 and a time-based derivative function 220. Each of these signals, along with an unmodified signal 222 is input into their corresponding gain functions, Kp 224, Ki 226, and Kd 228. These individually adjustable gains are adjusted to meet the dynamic performance and stability requirements of system 100 (shown in FIG. 1). The outputs of gain functions 224, 226, and 228 are input into a summing junction 230, the output of which is input into a limiter function 232. Limiter function 232 places appropriate bounds on the magnitude of active power PID controller 216 output.

In the exemplary embodiment, the output of active power PID controller 216 is inputted into a generator AC voltage regulator summing junction 234. AC voltage regulator summing junction 234 also includes a generator AC voltage set point 236 as an input, as well as the negative value of actual generator AC voltage 238. The output of summing junction 234 is inputted into generator voltage PID controller 240. Generator voltage PID controller 240 acts on the output of summing junction 234 by performing a time-based integration function 242 and a time-based derivative function 244. Each of signals 242 and 244, along with an unmodified signal 246 is input into corresponding gain functions, Kp 248, Ki 250, and Kd 252. These individually adjustable gains are adjusted to meet the dynamic performance, stability, and steady-state voltage regulation requirements of system 100. The outputs of gain functions Kp 248, Ki 250, and Kd 252 are input into a summing junction 254, the output of which is input into a gain function 256. The output of gain function 256 is input into a power amplification stage 258 that drives the required amount of excitation current into a field winding of generator exciter 114.

The level of current in the field winding of generator exciter 114 determines the level of excitation in the main field of generator 108. By tuning the gains of AC voltage controller 240 and active power controller 216, the desired response of generator 108 to varying load demands is achieved.

Figure 3:
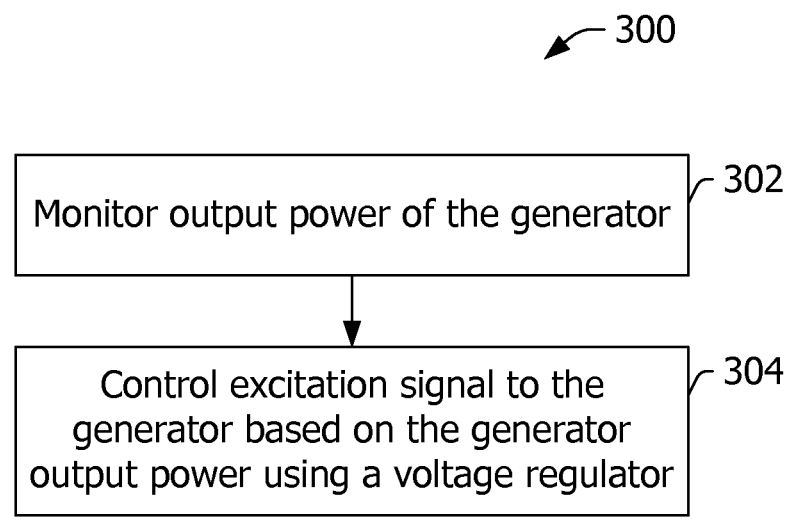
FIG. 3 is a flowchart of an exemplary method of distributing active power sourcing in the hybrid power plant system shown in FIG. 1.

FIG. 3 is a flowchart 300 of an exemplary method of distributing active power sourcing between generator 108 (shown in FIG. 1) and secondary power source 112 (shown in FIG. 1) to drive a load 110 (shown in FIG. 1) using voltage regulator 102 (shown in FIG. 1).

In the exemplary embodiment, the method includes monitoring 302 an output power of generator 108 by measuring an output voltage and an output current of generator 108 and calculating generator 108 output power based on the measured output voltage and output current using voltage regulator 102.

In the exemplary embodiment, the method further includes controlling 304 an excitation signal to generator 108 based at least in part on generator 108 output power using voltage regulator 102. In one embodiment, controlling 304 an excitation signal to generator 108 includes comparing generator 108 output power to an active power limit using voltage regulator 102 and limiting the output power of generator 108 using voltage regulator 102 when generator 108 output power exceeds the active power limit. Controlling the excitation signal to generator 108 may include inducing excitation of secondary power source 112. To limit the output power of generator 108, voltage regulator 102 may decrease the amount of voltage supplied to generator 108. Moreover, limiting the output power of generator 108 may also include preventing an undervoltage condition of generator 108.

The exemplary embodiments described herein facilitate distributing power sourcing to drive a load in a hybrid power plant system. More particularly, the embodiments described herein facilitate limiting active power output of a generator such that excitation of a secondary power source is induced during peak power demand to provide a smooth transition to using the secondary power source in combination with the generator. The embodiments facilitate automatically changing a voltage regulator's control from a voltage regulation regime to a constant power regime when a predetermined level of generator output power is measured. Moreover, the embodiments described herein facilitate limiting the amount of active power that the generator may deliver, causing the secondary power source to engage and deliver a portion of power to the load, which enables the system to meet the peak power demands of the load without overloading the generator. Moreover, the embodiments described herein facilitate reducing transient overloading of the prime mover and preventing unsteady power surges/dips and nuisance trips of the power conversion equipment.

Exemplary embodiments of a voltage regulator and methods for operating the same are described above in detail. The size ranges disclosed herein include all the sub-ranges therebetween. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A voltage regulator configured to:
monitor an output power supplied from a generator to a load;
compare the generator, output power to an active power limit;
regulate voltage supplied to the generator at or below a first predefined voltage limit when the monitored generator output power is less than or equal to the active power limit; and
decrease voltage supplied to the generator below a second predefined voltage limit lower than the first predefined voltage limit while controlling the generator to output a constant amount of power when the monitored generator output power exceeds the active power limit to lower the generator output voltage, causing sharing of power-sourcing of the load between the generator and a passive secondary power source, the passive secondary power source coupled in parallel with the generator to provide supplemental power to the load.

2. The voltage regulator of claim 1, further configured to:
measure an output voltage and an output current of the generator; and
calculate the generator output power based on the measured output voltage and output current.

3. The voltage regulator of claim 1, wherein to control an excitation signal provided to the generator, said voltage regulator is configured to:
share sourcing of the generator output power with the secondary power source.

4. The voltage regulator of claim 1, wherein to control an excitation signal provided to the generator, said voltage regulator is configured to:
distribute sourcing of the generator output power with a direct current (DC) secondary power source.

5. The voltage regulator of claim 1, further configured to:
regulate the generator output voltage in accordance with a voltage set-point when the generator output power does not exceed the active power limit.

6. A method of distributing active power sourcing for a load between a generator coupled in parallel to a secondary power source, said method comprising:
monitoring an output power supplied from the generator to the load;
comparing the generator output power to an active power limit;
regulating voltage supplied to the generator at or below a first predefined voltage limit when the monitored generator output power is less than or equal to the active power limit; and
decreasing voltage supplied to the generator using the voltage regulator below a second predefined voltage limit lower than the first predefined voltage limit while controlling the generator to output a constant amount of power when the monitored generator output power exceeds the active power limit to lower the generator output voltage, causing sharing of power-sourcing of the load the generator and the secondary power source, the secondary power source configured to provide supplemental power to the load.

7. The method of claim 6, further comprising:
measuring an output voltage and an output current of the generator; and
calculating the generator output power based on the measured output voltage and output current using a voltage regulator.

8. The method of claim 6, further comprising:
comparing the generator output power to an active power limit using a voltage regulator; and
using the voltage regulator to limit the output power of the generator when the generator output power exceeds the active power limit.

9. The method of claim 8, wherein limiting the output power of the generator comprises preventing an undervoltage condition of the generator output power.

10. A hybrid power plant system comprising:
a generator configured to produce an electrical output to drive a load;
a secondary power source coupled in parallel to said generator, said secondary power source configured to provide supplemental power to the load to assist said generator during peak power demand of the load; and
a voltage regulator coupled to said generator, said voltage regulator configured to:
monitor an output power supplied from said generator to the load;
regulate voltage supplied to said generator at or below a first predefined voltage limit when the monitored generator output power is less than or equal to an active power limit; and
decrease voltage supplied to the generator below a second predefined voltage limit lower than the first predefined voltage limit while controlling the generator to output a constant amount of power when the monitored generator output power exceeds the active power limit to lower the generator output voltage, causing sharing of power-sourcing of the load between said generator and said secondary power source during peak power demand.

11. The system of claim 10, wherein said voltage regulator is further configured to:
measure an output voltage and an output current of said generator; and
calculate said generator output power based on the measured output voltage and output current.

12. The system of claim 10, wherein said generator comprises a synchronous generator, and said secondary power source comprises an asynchronous power source.

* * * * *